United States Patent [19]

Nakayama et al.

[11] Patent Number: 4,583,418
[45] Date of Patent: Apr. 22, 1986

[54] SELECTING MECHANISM FOR VEHICULAR TRANSMISSION OPERATING APPARATUS

[75] Inventors: Hiroshi Nakayama; Makoto Sumi, both of Saitama, Japan

[73] Assignee: Honda Giken Kogyo Kabushiki Kaisha, Tokyo, Japan

[21] Appl. No.: 590,638

[22] Filed: Mar. 19, 1984

[30] Foreign Application Priority Data

Mar. 17, 1983 [JP] Japan ................................. 58-45103
Mar. 25, 1983 [JP] Japan ................................. 58-50153

[51] Int. Cl.⁴ ........................ G05G 9/12; B60K 20/02
[52] U.S. Cl. ....................................... 74/475; 74/477
[58] Field of Search ...................... 74/473 R, 475, 477

[56] References Cited

U.S. PATENT DOCUMENTS 4,174,644 11/1979 Nagy ..................................... 74/476
4,277,983 7/1981 Tzumi .................................... 74/475

FOREIGN PATENT DOCUMENTS 8201093 4/1982 Int'l Pat. Institute ............ 74/473 R
69325 4/1982 Japan ................................ 74/473 R Primary Examiner—William L. Freeh
Attorney, Agent, or Firm—Lyon & Lyon

[57] ABSTRACT

A selecting mechanism for a vehicular transmission operating apparatus having an interlock plate rotatably mounted to a mounting base plate. A selection shaft fixed at one end to the interlock plate is directly connected to the shift rod so as to transmit rotation of the shift rod directly to the interlock plate. A selection snugness arm is rotatably mounted to the mounting base plate and interacts with the selection shaft. A torsion spring retains the snugness arm in its non-rotated position. A snugging mechanism is connected to the snugness arm and has a spring loaded snugging member which rides on a variable heighth cam face so as to impart a variable resistance upon rotation of the shift rod.

9 Claims, 13 Drawing Figures

SELECTING MECHANISM FOR VEHICULAR TRANSMISSION OPERATING APPARATUS

The present invention relates to selecting mechanisms for vehicular transmission operating apparatuses, and more particularly, to such operating apparatuses which are interposed between a shift rod operated by a gear change lever and a group of shift forks for selectively engaging speed change gear mechanisms.

Selecting mechanisms according to the prior art are constructed having a transmission mechanism including a selection arm connected to a shift rod and the selecting interlock plate. As a result, such a selecting mechanism has a disadvantage since it has an increased number of parts. This makes the overall construction more complicated, raises the production costs and may lead to a reduction in the operating efficiency of such a selecting mechanism.

In addition, it is desirable to produce a transmission selecting mechanism which will allow the driver to feel, based on the resistance to movement of a gear change lever, the position of the gear changing mechanism. By so doing, a driver is enabled to be prevented from engaging the undesired gear train upon shifting the gear control mechanism.

The present invention contemplates the use of a selecting mechanism having a selection shaft fixed to one side portion of an interlock plate which is rotatably supported on a mounting base. A selection snugness arm having one end swingable relative to sub-mounting base; the other end being forked and interacting with the selection shaft is also used. A return spring for holding the select snugness arm in its non-rotated position is mounted between the select snugness arm and the mounting base. A snugging mechanism to provide resistance upon movement of the select snugging arm is interposed between the mounting base and a stopper plate and interacts with a variable height cam face formed thereon. One end of the selection shaft is fixed to the rotatable interlock plate. The other end of the select shaft is directly connected to a change piece which is mounted on the leading end of the shift rod and controlled by the gear selector mechanism.

As such, it is an object of the present invention to provide a selecting mechanism for a transmission operating apparatus wherein a selection interlock plate is selectively controlled accurately and having a reduced number of components so as to ensure easy assembly.

It is a further object of the invention to provide a selecting mechanism for a transmission operating apparatus which will be compact when assembled as a whole.

It is a further object of the invention to provide a selecting mechanism for a transmission operating apparatus which will be snugly retained in its respective selected position.

It is a further object of the invention to provide a selecting mechanism for a vehicular transmission operating apparatus having an improved selection efficiency and a lower production cost. Other and more detailed objects of the invention will become apparent upon examination of the drawings and description contained herein, wherein.

Figure 1:
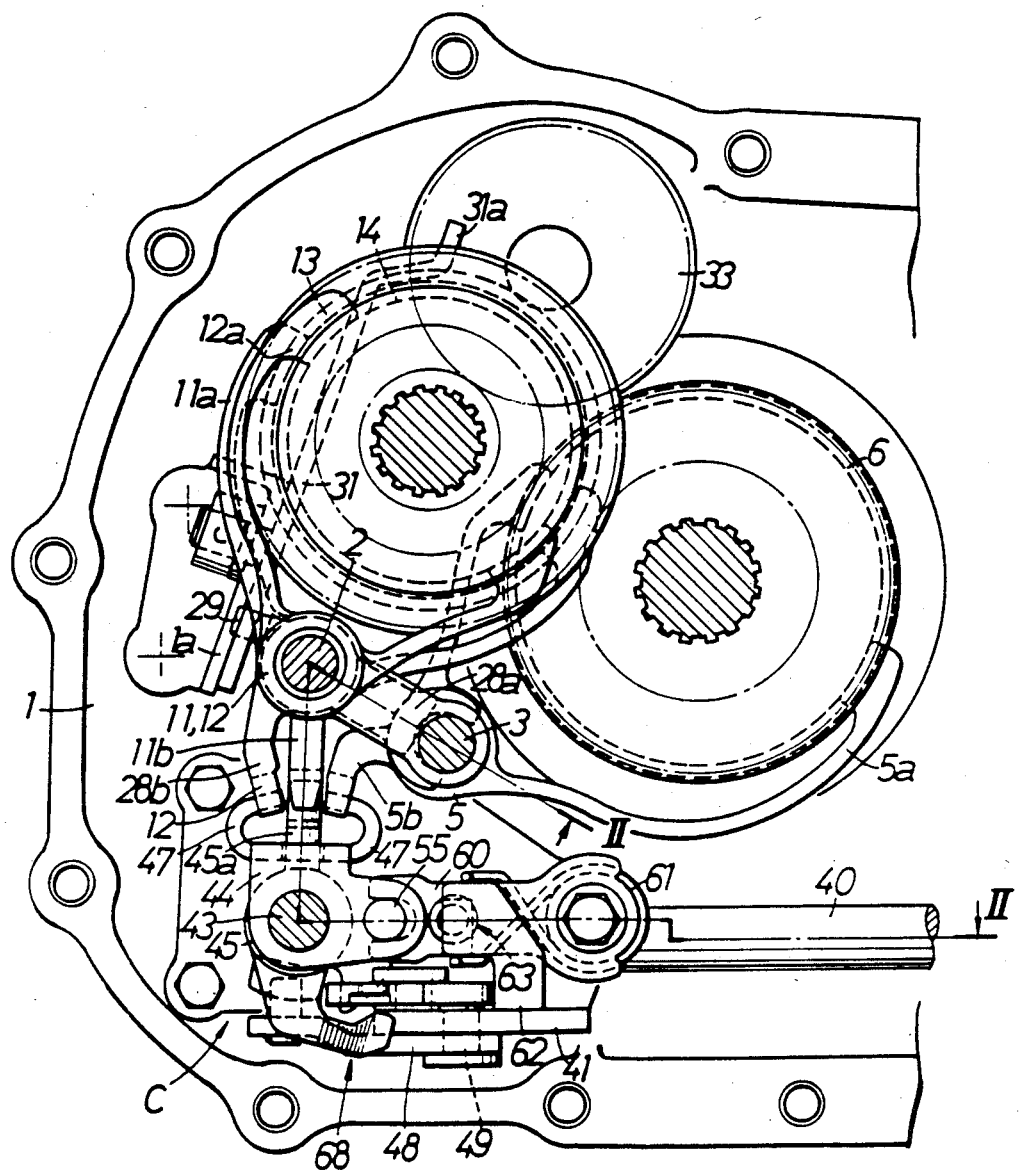
FIG. 1 is a side elevation of a transmission equipped with the mechanism of the present invention.

With reference to the accompanying drawings, an embodiment of the present invention will be described in connection with a vehicular transmission operating system having a multistep transmission with five forward speeds and one reverse speed. The operation of such a transmission is described in the following with reference to FIGS. 1–4.

A stationary fork shaft 2 is fixedly supported in a transmission case 1 by means of a fixing pin 4. In addition, a movable fork shaft 3 is mounted in the transmission case 1 parallel to the stationary fork shaft 2 and slidable in the axial direction. A first slidable shift fork 5 is mounted on the stationary fork shaft 2. The first shift fork 5 has its forked portion 5a engaging with a first sleeve 6 to selectively engage the not-shown first and second speed gear trains. Between the base portion of the first shift fork 5 and the stationary shaft 2, a retaining mechanism E1 is interposed to snugly retain the shift fork 5 in its neutral and engaged positions.

A second shift fork 11 and a third shift fork 12 are slidably mounted on the movable fork shaft 3. The second shift fork 11 has its forked portion 11a engaging a second sleeve 13 so as to be able to selectively engage the not-shown third and fourth speed gear trains. The third shift fork 12 has its forked portion 12a engaging a third sleeve 14 to selectively engage the not-shown fifth speed gear train.

A second retaining mechanism E2 is interposed between the base of the second shift fork 11 and the stationary fork shaft 2 to snugly retain the second shift fork 11 in its neutral and engaged positions. A third retaining mechanism E3 is contained in the base of third shift fork 12 so as to retain the third shift fork 12 in its neutral position.

To selectively engage the not-shown fifth speed gear train through the third shift fork 12, a fixed stopper ring 27 is formed on the movable fork shaft 3 to selectively engage with a portion of the third shift fork 12. The coaction of the stopper ring 27 with the third shift fork 12 allows the shift fork 12 to move integrally with the movable fork shaft 3 when the fork shaft is slid in one direction but left immovable when the movable fork shaft 3 is slid in the opposite direction. So constructed, the coaction of the movable fork shaft 3 and the third shift fork 12 may be used to engage the not-shown fifth speed gear train by movement in one direction and the not-shown reverse speed gear train by movement in the opposite direction.

To engage the not-shown reverse speed gear train, an operating member 28 of a reverse operating mechanism R is fixed on the aforementioned movable fork shaft 3. An arm 28a extending integrally from the operating member 28, as shown most clearly in FIG. 3, has its end portion formed into a shape substantially that of a "U" and is engaged with the aforementioned stationary fork shaft 2. The arm 28a through its "U"-shaped end, acts to stop the rotation of the movable fork shaft 3 prior to engagement of the reverse operating mechanism R.

Figure 3:
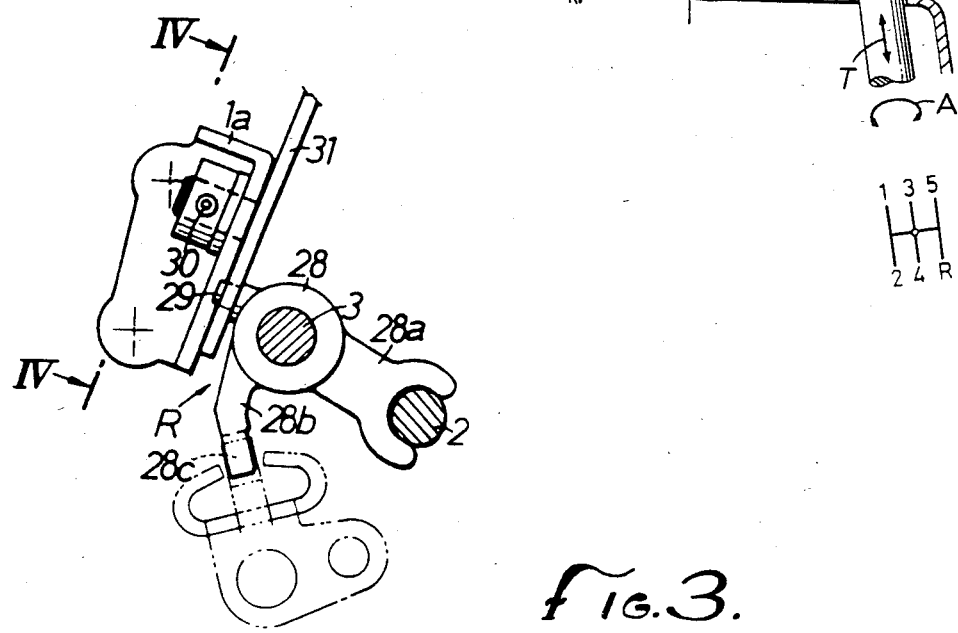
FIG. 3 is a sectional view taken substantially along line III—III of FIG. 2.
Figure 4:
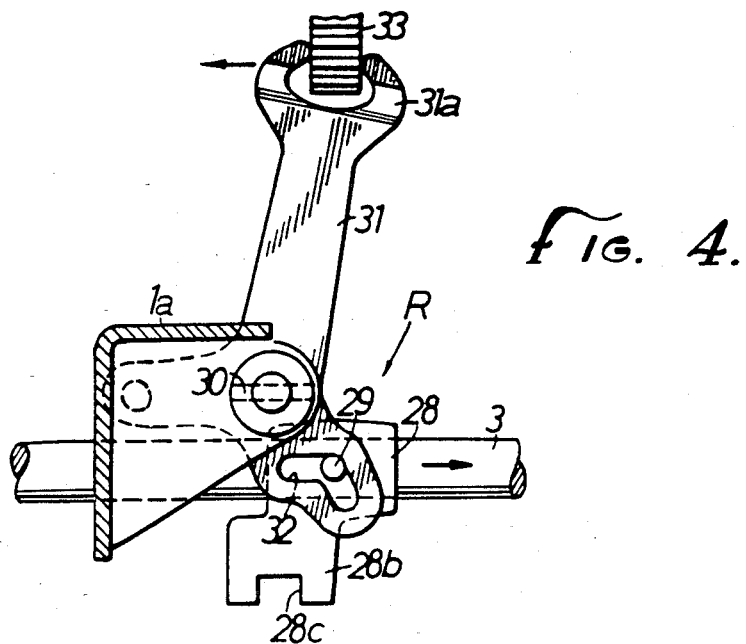
FIG. 4 is a sectional view taken substantially along line IV—IV of FIG. 3.

As shown in FIGS. 3 and 4, a reverse shift fork 31 is swingably connected through a pin 30 to a wall 1a integral with the transmission case 1. The reverse shift fork 31 is also connected to the operating member 28 through an engagement pin 29 and a hooked hole 32 arrangement. Paws 31a are formed on the leading end of the reverse shift fork 31 and embrace a reverse idle gear 33 such that movement of the movable fork shaft 3 to the right in FIG. 4 acts to swing the shift fork 31. This swinging of the shift fork 31 acts to engage the reverse idle gear 33 and thereby engage the not-shown reverse gear train.

Figure 2:
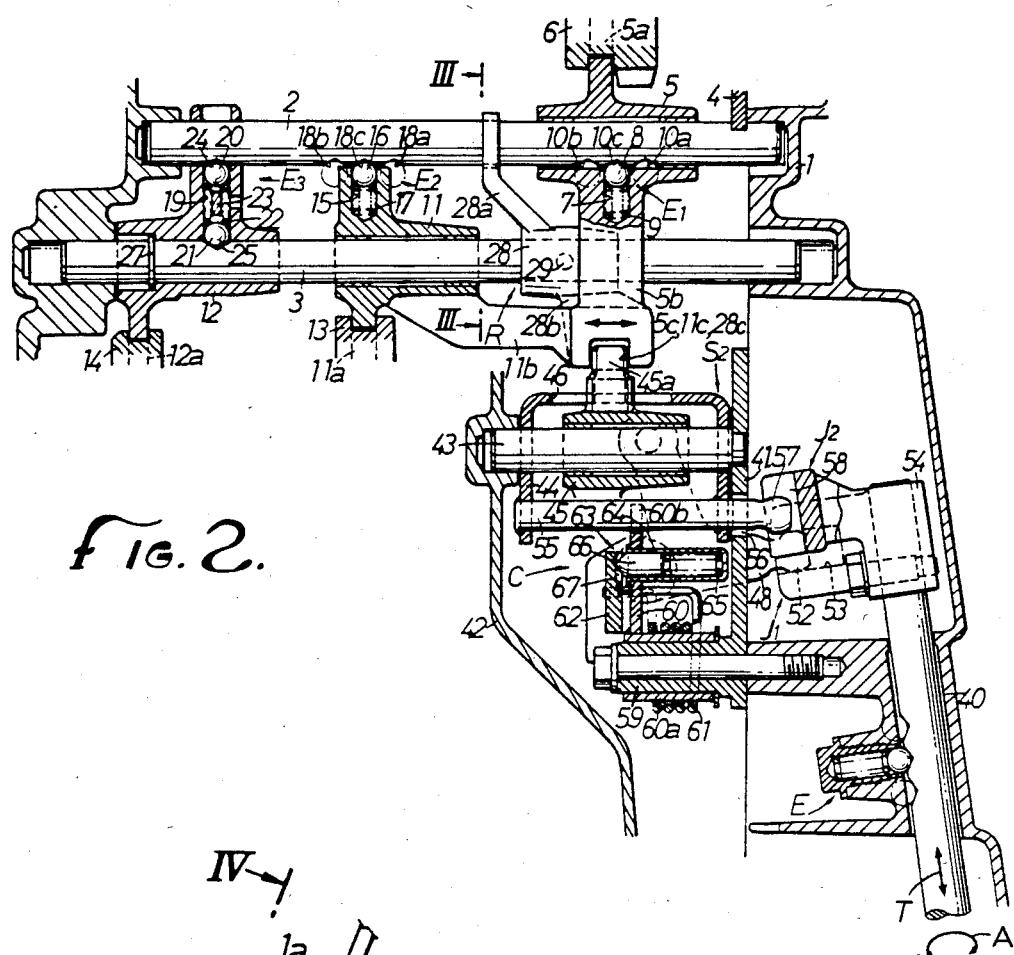
FIG. 2 is an expanded section taken substantially along line II—II of FIG. 1.

Operating arms 5b, 11b and 28b, shown in FIG. 2, integrally extend from the first shift fork 5, the second shift fork 11 and the boss of the reverse operating member 28, respectively. Engagement recesses 5c, 11c and 28c, are formed in the end of each operating arm 5b, 11b and 28b, respectively, and merge, as shown in FIGS. 1 and 2, such that the recesses are aligned below one side of the movable fork shaft 3 transverse to the direction of movement of the movable fork shaft 3. A transmission 1 shifting apparatus C, which will be described later herein, has a shift piece 45a which is selectively engageable with the aforementioned engagement recesses 5c, 11c and 28c so as to selectively shift the first shift fork 5, the second shift fork 11 and the reverse operating member 28.

If the first shift fork 5 is shifted to the right from its neutral position shown in FIG. 2, the first speed sleeve 6 is shifted in the same direction to engage the not-shown first speed gear train. If the first shift fork 5 is shifted to the left of the neutral position shown in FIG. 2, the first speed sleeve 6 is also shifted to the left to engage the not-shown second speed gear train. In either case, the shift fork 5 is snugly retained in its neutral and engaged positions by the action of the first retaining mechanism E1.

Similarly, if the second shift fork 11 is shifted on the movable fork shaft 3 to the right of its neutral position shown in FIG. 2, the second speed sleeve 13 is also shifted to the right to engage the not-shown third speed gear train. If the second shift fork 11 is shifted to the left of its neutral position shown in FIG. 2, the second speed sleeve 13 is also shifted to the left to engage the not-shown fourth speed gear train. Although the movable fork shaft 3 on which the second shift fork 11 is mounted may be moved in the axial direction, the fork shaft 3 is locked in position by the action of the third retaining mechanism E3 so as to enable the second shift fork 11 to selectively engage the not-shown third or fourth speed gear trains. Similar to the first shift fork 5, the second shift fork 11 has a retaining mechanism E2 to retain it in its neutral and engaged positions.

If the movable fork shaft 3 is slid to the right from its neutral position shown in FIG. 2, the third shift fork 12 is also shifted in that direction through the stopper ring 27. This slides the third speed sleeve 14 which acts to engage the not-shown fifth speed gear train. In this case, the retaining ball 20 of the third retaining mechanism E3 is disengaged from the notch 24 in the stationary fork shaft 2.

If the movable fork shaft 3 is slid to the left of the neutral position shown in FIG. 2, the third shift fork 12 is retained in position due to the third retaining mechanism E3. While the rotation of movable fork shaft 3 is being stopped by the "U"-shaped end of the reverse operating member arm 28a, only the movable fork shaft 3 is slid further to the left thereby moving the reverse operating member 28 in the same direction. This further motion by the movable shaft 3 acts to swing the reverse shift fork 31 which is engaged with the operating member 28 so as to engage the not-shown reverse gear train through the motion of the reverse idle gear 33.

As shown in FIG. 2, the transmission shifting apparatus C includes a shift rod 40 which may both rotate and slide in the axial direction supported in one side of the transmission case 1. The shift rod 40 is made coactive with a not-shown gear change lever. The shift rod 40 is retained in each of the shift positions by the action of a retaining mechanism E which is interposed between the shift rod 40 and the transmission case 1. Referring in detail to FIGS. 2 and 5-8, a mounting base plate 41 which has an "L"-shaped section is fixed to the inner wall of the transmission case 1. A shift shaft 43 is supported by the mounting base plate 41 and a supporting wall 42 which is integral with the transmission case 1. Near the ends of the shift shaft 43 there is rotatably borne an interlock plate 44 which has a substantially "C"-shaped section. Within the ends of the interlock plate 44 a cylindrical shift member 45 is fitted about the shift shaft 43 so as to be slidable along the axial direction of the shift shaft 43 as indicated by the arrows in FIG. 5. The shift member 45 has an integral shift piece 45a protruding therefrom and extending through the outside of the interlock plate 44 through a slot 46 formed therethrough.

As has been described before, the integral shift piece 5 is brought into selective engagement with the engagement recesses 5c, 11c and 28c of the shift forks 5 and 11 and the reverse operating member 28, respectively. As is most clearly shown in FIG. 5, the interlock plate 44 has a pair of integral hooked interlock pieces 47 which encircle the aforementioned shift piece 45a so that the shift piece 45a may accurately and correctly engage the selected engagement recess.

Figure 5:
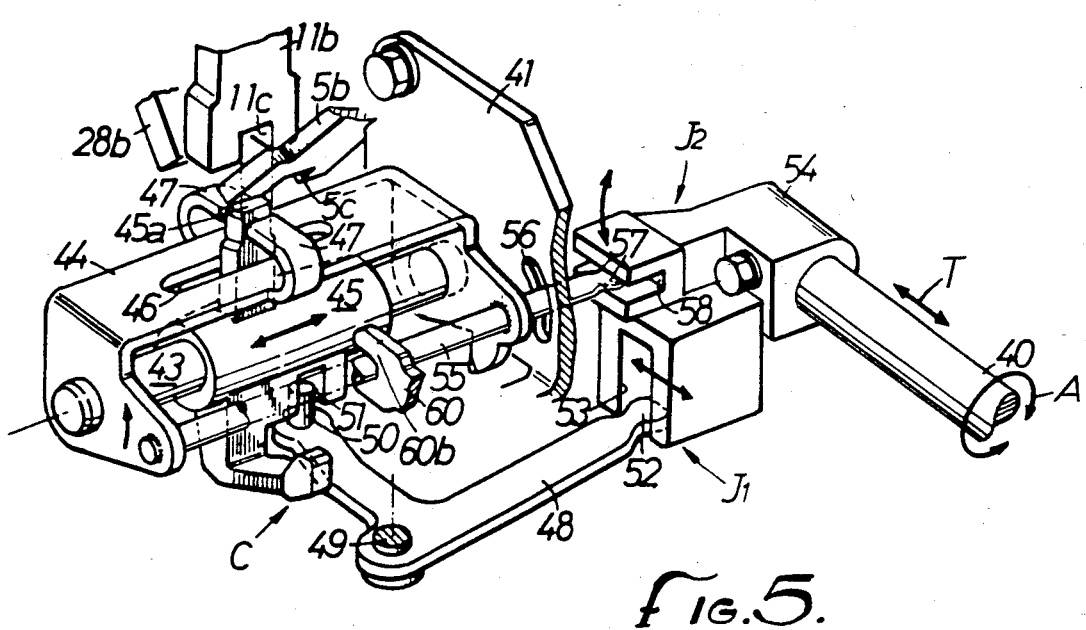
FIG. 5 is a perspective view showing a portion of the mechanism of the present invention.
Figure 6:
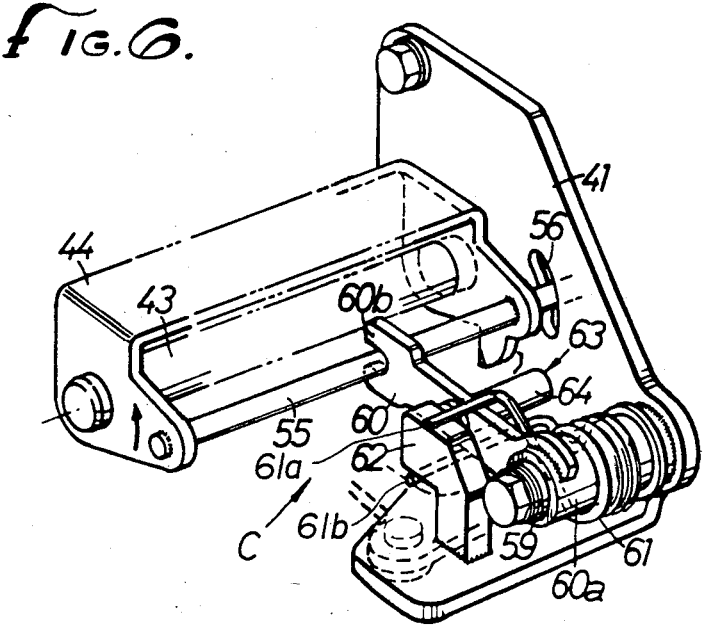
FIG. 6 is a second perspective view showing another portion of the mechanism of the present invention.

As shown in FIGS. 5 and 6, a bellcrank-shaped shift lever 48 with its middle portion rotatably hinged to the mounting base 41 by means of a pivot pin 49, is used to actuate the cylindrical shift member 45. A first end of the shift lever 48 has an engagement pin 50 protruding therefrom and engaged with an engagement recess 51 formed in the lower portion of the shift member 45. The other end of the shift lever 48 is formed with a connecting male portion 52 which is fitted to a connecting female portion 53 formed in a change piece 54 fixed to the end of the shift rod 40.

The aforementioned connecting male and female portions 52 and 53 provide a first joint J1. This first joint J1 acts to transmit axial motion of the shift rod 40, as shown by arrow T in FIGS. 2 and 5, to the shift lever 48 which moves about the pivot pin 49 to slide a shift member 45 along the axial direction of the shift shaft 43. However, the first joint J1 is constructed such that rotation of the shift rod 40, as shown by arrow A in FIGS. 2 and 5, will not be transmitted to the shift lever 48.

A select shaft 55 has one end fixedly connected to the lower end of the interlock plate 44. The other end of the select shaft 55 extends through the upper side of the interlock plate 44, through an arcuate hole 56 in the mounting base 41, and is connected to a second female portion 58 formed in the change piece 54 through a male portion 57 formed on the end of the select shaft 55. The male portion 57 of the select shaft 55 and the female portion 58 of the change piece 54 form a second joint J2. When the shift rod 40 is rotated, as indicated by arrow A in FIGS. 2 and 5, the second joint J2 transmits this rotation to the interlock plate 44 through the select shaft 55. When the shift rod 40 is slid in the axial direction, as shown by arrow T in FIGS. 2 and 5, the second joint J2 does not transmit this motion to the select shaft 55.

A select snugness arm 60 is rotatably mounted at one end 60a about a supporting shaft 59 which is made integral with the mounting base 41. The select snugness arm 60 has a forked portion 60b formed at its other end which interacts with the select shaft 55. A return spring 61 is wound about the supporting shaft 59 near the rotatable portion 60a of the select snugness arm 60. As shown in FIG. 6, a stopper plate 62 is fixedly connected to the mounting base 41 adjacent to the select snugness arm 60.

The return spring 61 has a first end 61a engageable with the upper edge of the stopper plate 62 or the upper edge of the select snugness arm 60. A second end 61b of the return spring 61 is engageable with the lower edge of the stopper plate 62 or the lower edge of the select snugness arm 60. The select snugness arm 60 is retained in its neutral non-rotated position due to the elastic force of the return spring 61.

As shown in FIG. 2, a snugging mechanism 63 is mounted between the mounting base plate 41 and the stopper plate 62 and formed through the select snugness arm 60. The construction of the snugging mechanism 63 will be described as follows with reference to FIGS. 2, 8 and 9. A spring enclosure 64 with its open end facing the stopper plate 62 is formed through the mid-point of the select snugness arm 60. A snugging spring 65 and a snugging member 66 are fitted within the spring enclosure 64.

The snugging member 66 has its leading end formed as a frusto-conical shape and is urged towards the innerface of the stopper plate 62 due to the compression of the snugging spring 65. The innerface of the stopper plate 62 has a snugging cam face 67 formed therein facing the protruding end of the snugging member 66. The snugging cam face 67 is formed, as shown in FIG. 9, with a valley "a" and a low and high area "b" and "c", respectively, extending from the valley "a".

When the select snugness arm 60 is rotated from its neutral position, which corresponds to engagement of the third or fourth not-shown gear trains, down to a position which corresponds to engagement of the first or second not-shown gear trains, the snugging member 66 is moved from the valley "a" to the low area "b" against the force of the snugging spring 65. Due to the small amount of additional compression of the snugging spring 65, this selection may be accomplished with relatively low resistance. When the select snugness arm 60 is moved from its neutral postion to a position corresponding to engagement of the not-shown fifth speed gear train or engagement of the reverse speed gear train, the snugging member 66 is moved from the valley "a" to the high area "c" against the force of the snugging spring 65. Due to the greater amount of compression of the snugging spring 65 required to accomplish such a selection, the resistance is relatively high.

Figure 7:
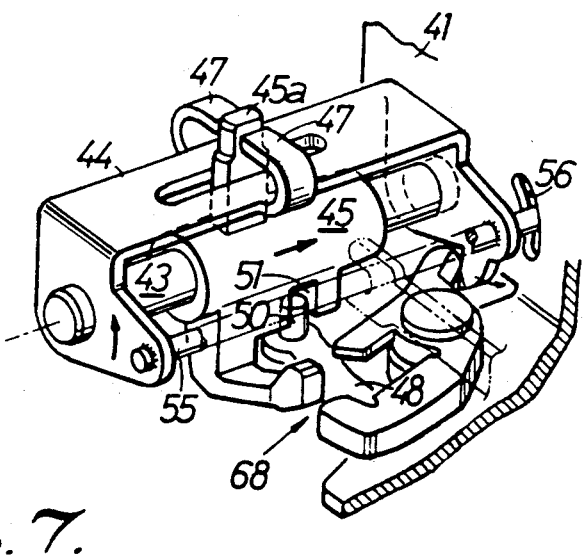
FIG. 7 is a third perspective showing still another portion of the mechanism.

FIG. 7 shows an error preventing device 68 connected to the mounting base 41 to prevent any direct shift from engagement of the fifth speed gear train to engagement of the reverse speed gear train. A detailed description of the error preventing device 68 is not included since it does not pertain to the present invention.

The operation of the transmission shifting apparatus C of the present invention will be explained as follows with reference to FIGS. 2, 5, 6, 8 and 9. In the state illustrated in FIGS. 8A and 9A, the interlock plate 44 and the select snugness arm 60 are held in their respective neutral positions due to the elastic force of the return spring 61. As such, the shift piece 45 corresponds to the engagement recess 11c of the second shift fork 11.

If the shift rod 40 is slid in the axial direction, i.e., gear shift-control, the shift lever 48 is rotated about the pivot pin 49 through the first joint J1 so that the shift member 45 is shift-controlled. This acts to move the shift shaft 43 to the left or right, thereby engaging either the not-shown third speed gear train or the not-shown fourth speed gear train through engagement of the shift piece 45a with the shift fork recess 11c to slide the second shift fork 11 on the movable fork shaft 3 as described hereinabove.

Figure 8A:
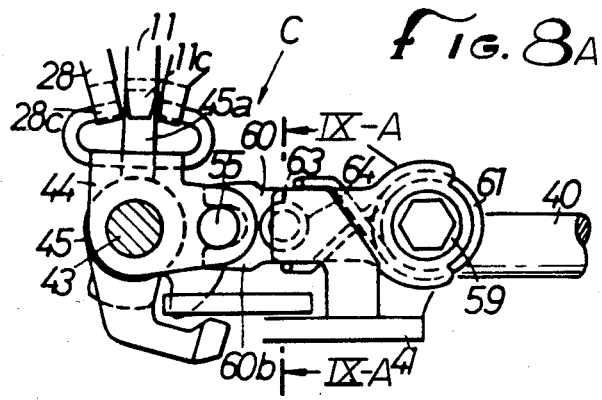
FIGS. 8A, 8B and 8C are side views showing the operation of the mechanism of the present invention.
Figure 9A:
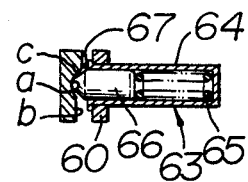
FIGS. 9A, 9B and 9C are sectional views taken substantially along lines IX(a)—IX(a), IX(b)—IX(b) and IX(c)I—X(c) of FIGS. 8A, 8B and 8C, respectively.
Figure 8B:
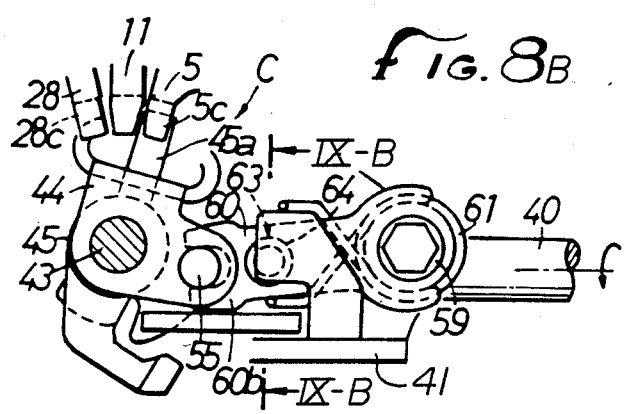
Figure 9B:
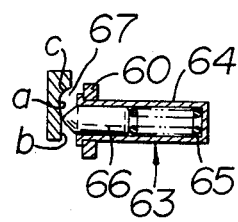

If the shift rod 40 is rotationally turned to the left of its neutral position illustrated in FIGS. 5 and 8, to engage the not-shown first or second speed gear trains, i.e., gear selection control, the rotation of the shift rod 40 is transmitted to the select shaft 55 through the second joint J2. This rotation tends to rotate the interlock plate 44 downward about the shift shaft 43 until the shift piece 45a is engageable with the engagement recess 5c of the first shift fork 5 as shown in FIG. 8B. In this case, the select snugness arm 60 is swung downward from its neutral position illustrated in FIGS. 5 and 8A about the pivot pin 59 and against the force of the return spring 61. This rotation causes the snugging member 66 to ride up over the low area "b" of the snugging cam face 67, as shown in FIG. 9B, to impart a moderate amount of resistance to the driver. This indicates the selection of the first speed or second speed position. If the shift rod 40 is shift controlled, i.e. moved axially, back and forth in a state wherein the first speed or second speed position is selected, as shown in FIG. 8B, the shift member 45 is moved to the left or right on the shift shaft 43 so that the first shift fork 5, shown in FIG. 2, is shifted on the stationary fork shaft 2 to engage the first or second speed gear trains as described hereinabove.

Figure 8C:
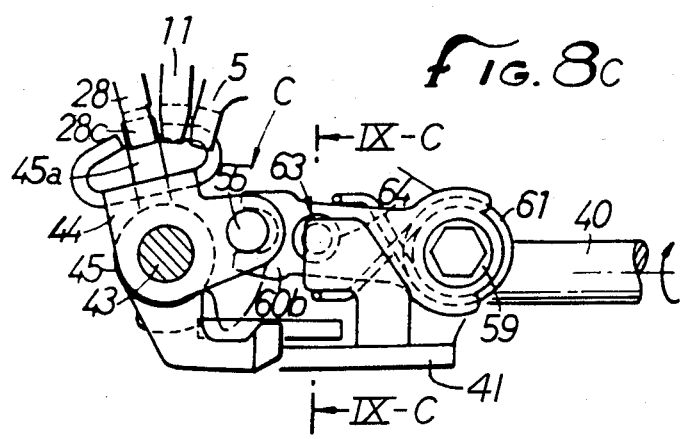
Figure 9C:
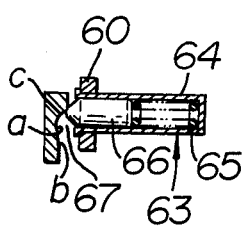

If the shift rod 40 is rotationally controlled to the right of the neutral position shown in FIGS. 5 and 8 so that it is select-controlled to the fifth speed-reverse position, its rotation tends to raise the select shaft 55 through the second joint J2, as shown in FIG. 8C. As a result, the interlock plate 44 is swung upward about the shift shaft 43 such that the shift piece 45 corresponds to the engagement recess 28c of the reverse operating member 28. In this case, the select snugness arm 60 is swung upward about the pivot pin 59 against the force of the return spring 61 due to the upward rotation of the select shaft 55. This upward rotation causes the snugging member 66 to ride over the high area "c" of the snugging cam face 67 as shown in FIG. 9C. This imparts a higher resistance to the driver indicating the feeling of the fifth speed-reverse position selection. If in the state in which the selection is made to the fifth speed-reverse position, as shown in FIG. 8C, the shift rod 40 is shift-controlled, i.e. moved axially, as has been described hereinbefore, the shift member 45 is moved to the left or right on the shift shaft 43 so as to move the reverse operating member 28, the movable fork shaft 3 and the third shift fork 12 to engage either the fifth speed gear train or the reverse speed gear train as described hereinabove.

Having fully described the invention herein in reference to a transmission having five forward speeds and one reverse speed, it is intended that such description is for purposes of illustration only and it is not intended to limit the scope of the appended claims.

We claim:

1. A selecting mechanism for a vehicular transmission operating apparatus including a mounting base fixed to the transmission case, a rotatable interlock plate with a slot-formed in one face, a slidable shift member with an integral shift piece protruding through the slot and a shift rod connected to a gear change lever so as to rotate and move axially, comprising, a change piece mounted on the shift rod, a selection shaft, a first end of said selection shaft being fixed to the interlock plate, the second end of said selection shaft being slidably and rotatably connected to said change piece, an arcuate hole formed in the mounting base plate to accommodate movement of said selection shaft, a selection snugness arm rotatably connected to the mounting base, said selection snugness arm having a forked end interacting with said selection shaft, a stopper plate connected to the mounting base, a spring enclosure with an open end extending through said selection snugness arm, a variable height cam face formed on the inner face of said stopper plate, a snugging member fitted within said enclosure and interacting with said cam face, means to urge said snugging member towards said cam face, means to actuate the shift member and means to maintain said selection snugging arm in its non-rotated position.

2. A selecting mechanism as set forth in claim 1 wherein said means to maintain said selection snugness arm in its non-rotated position includes a torsion spring bearing on said selection snugness arm and said stopper plate.

3. A selecting mechanism as set forth in claim 1 wherein said selection shaft is connected to said change piece by a male connection formed on the end of said selection shaft and a slotted female connection formed in said change piece.

4. A selecting mechanism as set forth in claim 1 wherein said means to actuate the shift member includes a bellcrank pinned to the mounting plate, a pin formed in one end of said bellcrank and engaged with the shift member, a male portion formed in the other end of said bellcrank and a corresponding female connection formed in said change piece.

5. A selecting mechanism for a vehicular transmission operating apparatus including a mounting base plate fixed to the transmission case, a rotable interlock plate with a slot formed in one face, a slidable shift member having an integral shift piece protruding through the slot and a shift rod rotable and movable in the axial direction, comprising, a selection shaft with a first end connected to said interlock plate, means directly connecting a second end of said selecting shaft to the shift rod, said selection shaft being arranged so as to extend substantially parallel to the rotable interlock plate axis of rotation and so as to move in unison with the interlock plate, an arcuate hole formed in the mounting base plate to accommodate curvilinear movement of said selection shaft and spring activated resistance means arranged to maintain the shift rod in its non-rotated position.

6. A selecting mechanism as set forth in claim 5 wherein said direct connection means includes a change piece mounted on the end of the shift rod, a male connection formed on said second end of said selection shaft and a slotted female connection formed in said change piece.

7. A selecting mechanism as set forth in claim 5 wherein said spring activated resistance means includes a rotatable select snugness arm interacting with said selection shaft and a torsion spring bearing on said select snugness arm to maintain said select snugness arm in its non-rotated position.

8. A selecting mechanism as set forth in claim 7 wherein said spring activated resistance means further includes a stop plate with a variable height cam face formed therein, a spring enclosure formed through said select snugness arm and having an open end facing said cam face, a snugging member fitted within said spring enclosure and a compression spring urging said snugging member towards said cam face.

9. A selecting mechanism for a vehicular transmission operating apparatus including a mounting base plate fixed to the transmission case, a rotatable interlock plate with a slot formed in one face, a slidable shift member having an integral shift piece protruding through the slot and a shift rod rotatable and movable in the axial direction, comprising a selection shaft with a first end connected to said interlock plate, means directly connecting a second end of said selection shaft to the shft rod, an arcuate hole formed in the mounting base plate to accommodate movement of said selection shaft and spring activated resistance means to maintain the shift rod in its non-rotated position, said spring activted resistance means including a rotatable select snugness arm interacting with said selection shaft, a rorsion spring bearing on said select snugness arm to maintain said select snugness arm in its non-rotated position, a stop plate with a variable height cam face formed therein, a spring enclosure formed through said select snugness arm and having an open end facing said cam face, a snugging member fitted within said spring enclosure and a compression spring urging said snugging member towards said cam face.

* * * * *

UNITED STATES PATENT AND TRADEMARK OFFICE
CERTIFICATE OF CORRECTION

PATENT NO. : 4,583,418

DATED : April 22, 1986

INVENTOR(S) : Hiroshi Nakayama & Makoto Sumi

It is certified that error appears in the above-identified patent and that said Letters Patent are hereby corrected as shown below:

```
Column 7, line 57 change "rotable" to --rotatable--.
Column 8, line 2 change "rotable" to --rotatable--.
Column 8, line 7 change "rotable" to -- rotatable--.
Column 8, line 43 change "shft" to --shift--.
Column 8, line 49 change"rorsion" to --torsion--.
```

Signed and Sealed this

Twenty-fifth Day of November, 1986

*Attest:*

DONALD J. QUIGG

*Attesting Officer*      *Commissioner of Patents and Trademarks*